(No Model.) 3 Sheets—Sheet 1.
R. A. CARTER.
ART OF MAKING TEMPLE WIRES FOR SPECTACLES.
No. 260,658. Patented July 4, 1882.
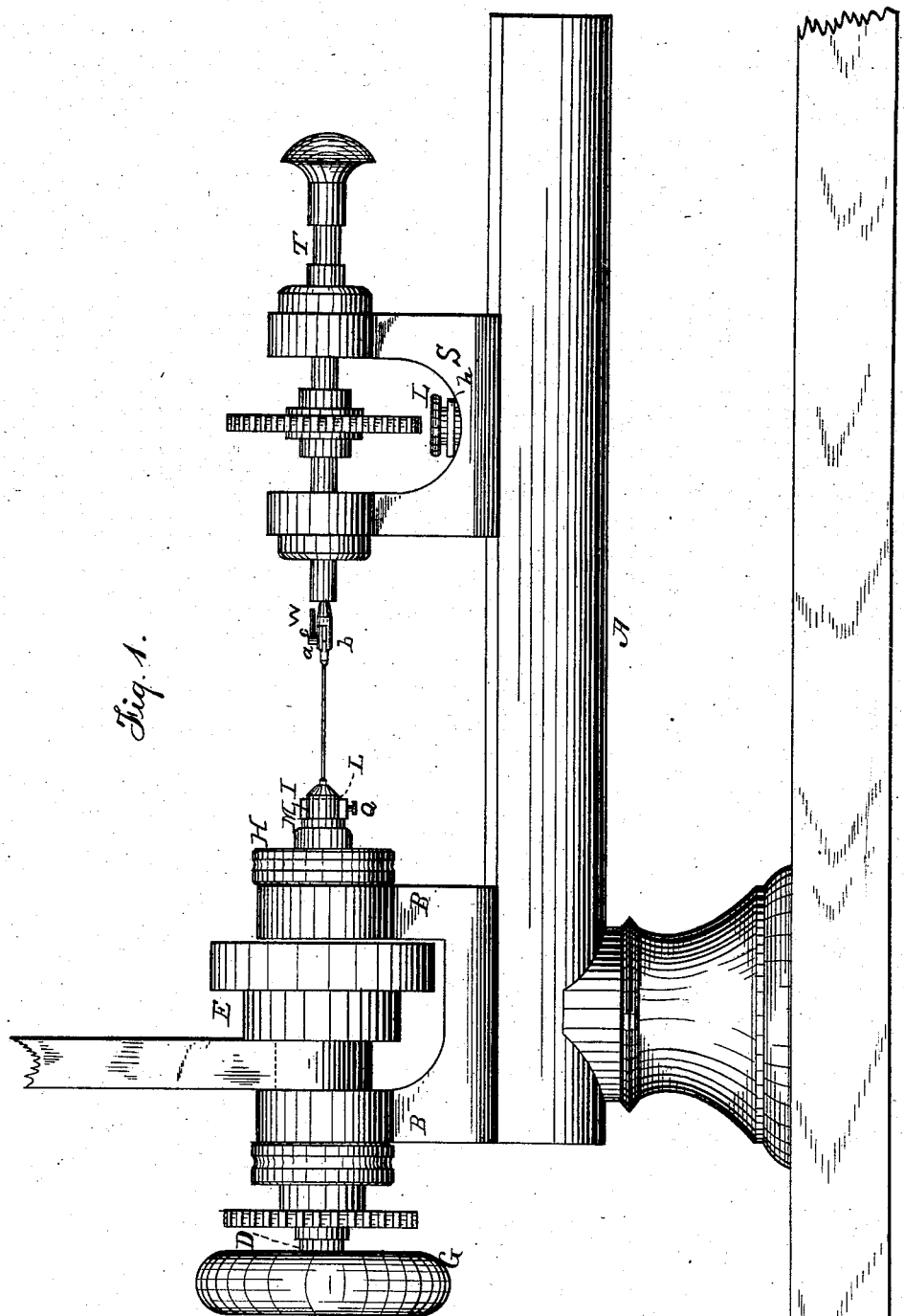
Witnesses;
Chas. O. Gill
Herman Gustow
Inventor;
Robert A. Carter,
By his Attys.
Cox & Cox (No Model.) 3 Sheets—Sheet 2.
R. A. CARTER.
ART OF MAKING TEMPLE WIRES FOR SPECTACLES.
No. 260,658. Patented July 4, 1882.
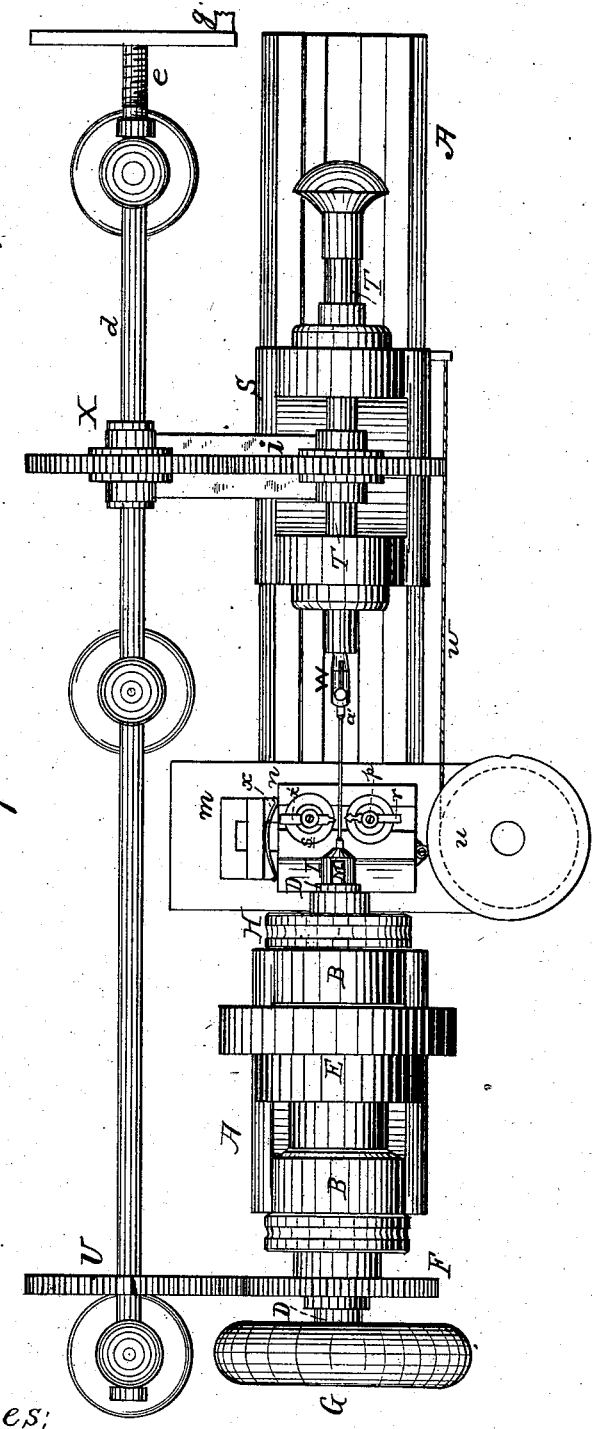
Witnesses:
Chas. C. Gill
Herman Gustow
Inventor:
Robert A. Carter
By his Attys.
Cox & Cox (No Model.) 3 Sheets—Sheet 3.
R. A. CARTER.
ART OF MAKING TEMPLE WIRES FOR SPECTACLES.
No. 260,658. Patented July 4, 1882.
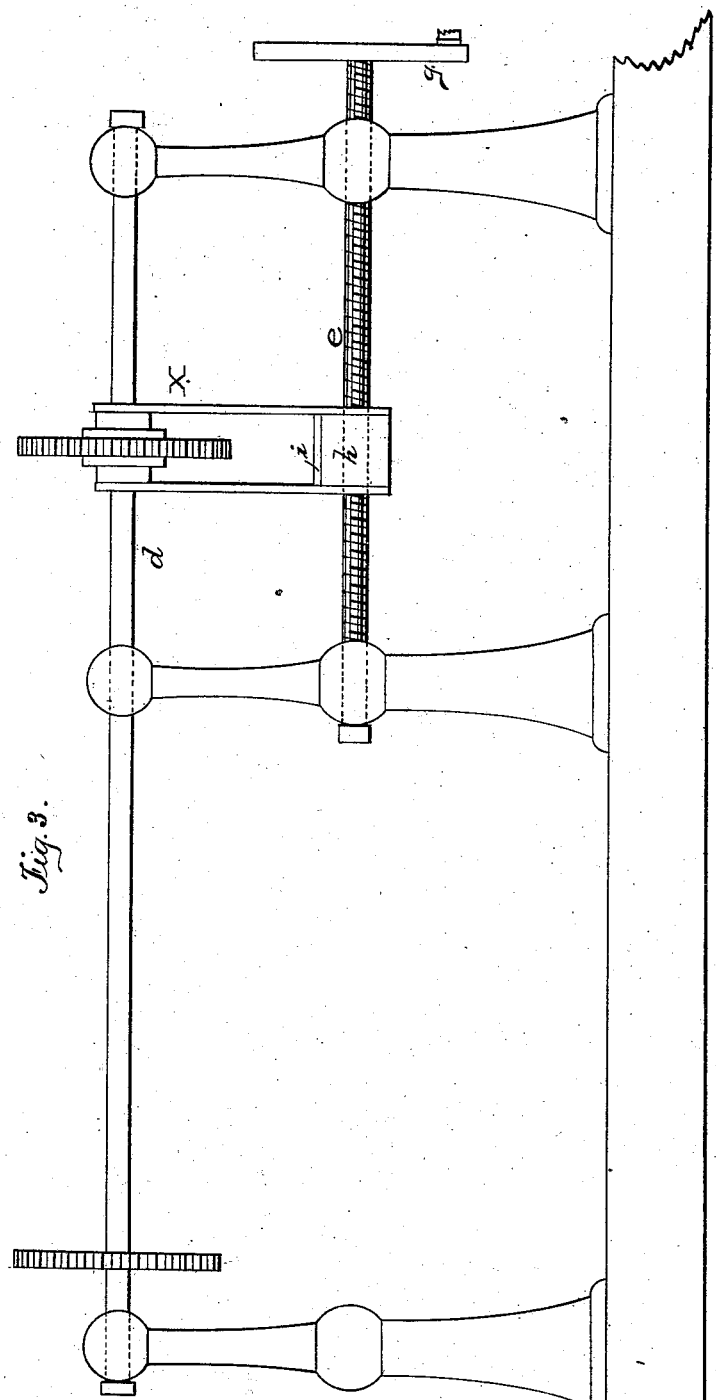
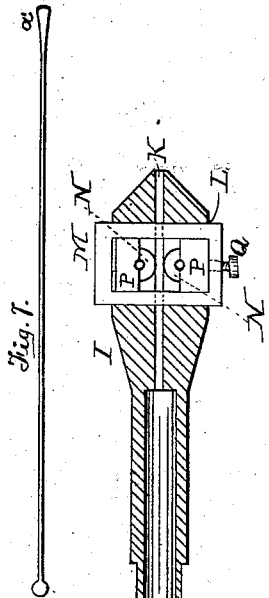
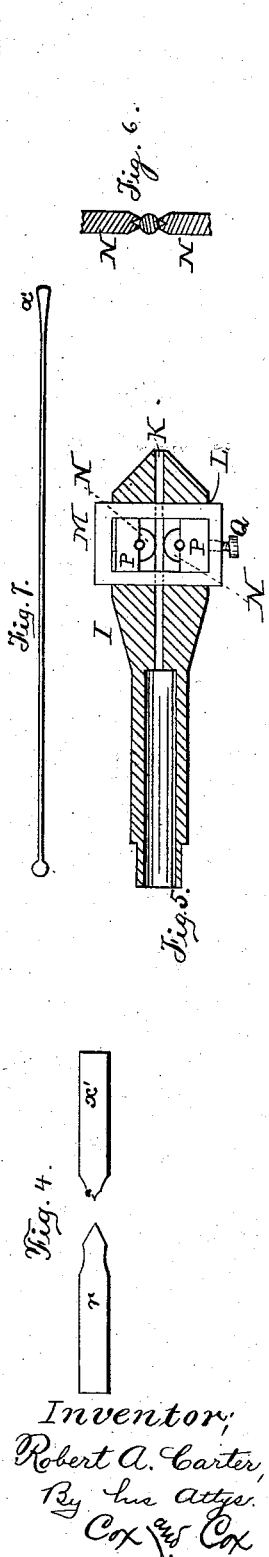
Witnesses:
Chas. O. Gill
Herman Gustow.
Inventor,
Robert A. Carter,
By his attys.
Cox and Cox

UNITED STATES PATENT OFFICE.

ROBERT A. CARTER, OF NEW YORK, N. Y., ASSIGNOR TO THE WARWICK MANUFACTURING COMPANY, OF NEWARK, NEW JERSEY.

ART OF MAKING TEMPLE-WIRES FOR SPECTACLES.

SPECIFICATION forming part of Letters Patent No. 260,658, dated July 4, 1882.

Application filed October 14, 1881. (No model.)

*To all whom it may concern:*

Be it known that I, ROBERT A. CARTER, of New York, in the county of New York and State of New York, have invented a new and useful Improvement in Spectacles, of which the following is a specification, reference being had to the accompanying drawings.

The invention has relation to the manufacture of spectacles; and it consists in a novel process and machine for manufacturing that part of the spectacle known as the "temples" or "ear-wires." The temple itself, made according to my machine, is new, and is made the subject of an application for Letters Patent of even date herewith.

The exact nature of my invention will be understood from the detailed description hereinafter presented, reference being had to the accompanying drawings, of which—

Figure 1 is a side elevation of a machine embodying the elements of the invention. Fig. 2 is a top view of same. Fig. 3 is a side view of the mechanism employed for operating the traveling carriage. Fig. 4 is a detached top view of the cutting-tools. Fig. 5 is a central longitudinal section of the dog. Fig. 6 is a detached vertical section, showing the position of the wire between the wheels of the dog; and Fig. 7 is a detached view of the temple or ear-wire as it leaves the machine.

A indicates the base of the machine, which is made after the pattern of the lower part of a turning-lathe. At the left-hand end of the base A are provided the standards B B, in which is journaled the hollow spindle D.

Between the standards B is mounted upon the spindle D the cone-pulley E, whereby power is transmitted to the spindle by the ordinary driving-belt.

The right-hand end of the spindle D is provided with the usual collar, H, and has set in its extremity the chuck I, which is a cylindrical piece of metal having one end reduced so as to fit within the end of the spindle, the other end being screwed with the spindle attached to the hand-wheel G.

The chuck has passing through its longitudinal center the aperture K, which will be of sufficient size to permit the passage through it of the wire to be treated.

In the end of the chuck I will be cut at right angles to its longitudinal center the slot or pocket L, in which is placed the frame or dog M, carrying the feed-wheels N. These wheels are supplied with the bearing-blocks P, which fit within the frame M, as indicated in a detached view.

The bearing-blocks P are placed one in each end of the frame M, one having a backing of rubber or other suitable material, and the other being provided with a set-screw, Q, whereby its relation to the other bearing-block may be adjusted at will.

The bearings of the feed-wheels N are in cross-section in the form of an inverted W, and when in position the base or lower part of the W on one wheel is directly opposite to the like part of the other wheel, the space between the wheels N being directly opposite to the aperture K hereinbefore mentioned. Thus when the rod of wire to be treated is placed within the hollow spindle D its end will enter and pass through the said aperture K and through the space between the feed-wheels, and when in this position the sharpened edges of the feed-wheels will grip the wire and prevent it from turning in the spindle, but at the same time allowing it to travel longitudinally through the same. The purpose of the feed-wheels N could be effected if the wheels had gripping-edges somewhat different in form from those I have described. For instance, one of the wheels might have an edge in the shape of an inverted W and the other in the form of a V. In this case the sharpened edges would prevent the wire from turning in the spindle, but would not interfere with its longitudinal movement.

Upon the right-hand end of the base A of the machine is provided the carriage S, which is adapted to travel back and forward on the same, and has mounted in its upper ends the spindle T, which, by gearing or otherwise, is caused to revolve at the same speed as the chuck I, and which aids in giving a rotatory motion to the wire.

The left-hand end of the spindle T is hollow, and contains a small vise, W, consisting of two jaws, *a b*, and a regulating-screw, *c*.

The carriage S may be made to travel back and forward on the base A by any convenient means. In the drawings, however, I show one method of operating it which has been used with satisfactory results, and which consists of the frame X, mounted upon the horizontal rod $d$ and screw $e$, and carrying the gear-wheel U, which meshes with a similar wheel secured upon the spindle T. The lower end of the frame X is supplied with a block, $h$, which is internally threaded, and through which the screw $e$ passes. Upon one extremity of the screw $e$ is, in the present instance, provided a crank, $g$, by which it may be turned by hand. Upon the upper surface of the block $h$ is secured one end of the bar $i$, the other end of which is connected with the carriage S by means of the screw L'.

It is obvious that when the screw $e$ is operated by the crank $g$ the frame X will be caused to move along the rod $d$, and will draw, by the bar $i$, the carriage S in a corresponding direction. Motion is given to the rod $d$ by a gear-wheel, U, which meshes with a similar wheel, F, on the spindle D.

Upon the base A, in near relation to the right-hand end of the chuck I, is placed the base-plate $m$, carrying a smaller guide-plate, $n$, in which is mounted the post $p$, to which the knife $r$ is secured in the usual manner, the point of the knife being in such relation to the rod of wire extending from the chuck I that it may act upon it, as hereinafter described.

In rear of the guide-plate $n$ is mounted upon an axle the cam-shaped wheel $u$, which is attached by the string $w$ to the carriage S, and which is caused to rotate as the carriage S, in its movement, draws upon the said string.

In front of the guide-plate $n$ is placed the spring $x$, whose tension is always exerted to keep the said guide-plate $n$ in firm contact with the cam-wheel $u$. Thus it will be seen that as the cam-wheel revolves the guide-plate $n$ and the knife which it carries will have a movement determined by the outline of the cam.

Upon the guide-plate $n$ is also provided a post, $s$, supporting the knife $x'$, the cutting-edge of which is in the form of two quarter-circles, and approaches the rod of wire to be manipulated from the opposite side to that of the knife $r$ and slightly to the left of same. The knife $x'$ is made adjustable toward or from the rod of wire in the usual manner.

In the operation of the machine the rod of wire is inserted into the hollow spindle D, its right-hand end passing through the chuck I and between the feed-wheels, and being exposed for a portion of its length. The carriage S is then drawn toward the left of the base A, and the exposed end of the rod of wire secured in the vise W, after which the machine is set in motion and the operation of treating the rod of wire proceeded with. The machine being in the condition described, the first step in the process is, by turning the crank $g$, to draw the carriage S gradually and evenly toward the right-hand end of the base A. This, through the cord $w$, causes the cam to revolve, which at this starting-point gradually forces the guide-plate $n$ toward the rod of wire (which is now revolving very rapidly) and causes the knife $r$ to cut the same until the even surface of the cam comes in contact with the guide-plate $n$, after which time the knife, instead of farther penetrating the rod of wire, can be made by the shape of the form either to retain its position, and thus cut a wire of uniform thickness, or gradually to retire, thus forming a wire gradually increasing in thickness. The carriage S, traveling toward the right, operates to draw the rod of wire through the spindle D and to bring it in contact with the knife $r$ for treatment. The first incision made in the rod of wire tapers inward, as shown enlarged in Fig. 7, forming a bulb, $a'$, at that end of the wire. This tapering cut is owing to the movement of the carriage and wire while the latter is in contact with the knife. After a sufficient length of the wire has been reduced to form a temple the base-plate $m$ is made to slide forward at right angles to the base A by means of a crank or otherwise. The knife $r$ is thereby drawn away from the wire and the knife $x'$ is brought into contact with it at a point a little to the left of that at which the knife $r$ left off cutting. The temple is thus cut off from the wire, and the contour of the two knives is such as to leave the part of the temple which lies between them and which forms its extremity in the shape of a ball.

The rod of wire, or the "temple," as it may now be called, is shown enlarged, for clearness of illustration, in Fig. 7. It consists of a plain rod of wire having a bulb on one end and a ball or bulb of smaller size on the other, the whole being of one solid piece of metal, in which respect it is different from the temples of spectacles heretofore constructed. The larger bulb on the rod of wire is designed to pass behind the ear of the wearer in the usual manner, while the smaller bulb or ball will be manipulated into the hinge by hand or otherwise.

What I claim as my invention, and desire to secure by Letters Patent, is—

1. A machine for making the temples of spectacles containing the following elements: first, a hollow chuck adapted to permit the wire to move through it longitudinally, and to prevent the wire from turning except with the chuck; second, a traveling carriage furnished with mechanism adapted to seize the end of the wire and gradually draw it through the chuck; third, a spindle or center caused to rotate in connection with the chuck or head; fourth, a knife arranged to reduce the thickness of the rod of wire between its ends, the whole operating in combination with mechanism for actuating the elements, substantially as set forth.

2. In a machine for making the temples of spectacles, the hollow chuck of the nature described, in combination with the traveling carriage carrying a spindle and vise adapted to revolve and to retain the end of the wire to be manipulated, and with a knife for reducing the thickness of the metal, and with a knife for cutting off the wire.

3. In a machine for making the temples of spectacles, the hollow chuck of the nature described, in combination with the traveling carriage carrying a spindle and vise adapted to revolve and to retain the end of the wire to be manipulated, and with a knife for reducing the thickness of the metal.

4. In a machine for making temples for spectacles, a traveling carriage furnished with mechanism adapted to seize the end of the wire and draw it through the rotating chuck, substantially as set forth.

In testimony that I claim the foregoing improvement in spectacles, as above described, I have hereunto set my hand this 11th day of October, 1881.

ROBERT ALEXANDER CARTER.

Witnesses:
HERMAN GUSTOW,
CHAS. C. GILL.